US012601553B2

(12) United States Patent
Jin et al.

(10) Patent No.: US 12,601,553 B2
(45) Date of Patent: Apr. 14, 2026

(54) METHOD FOR IDENTIFYING AND ELIMINATING AMMONIUM SALT DEPOSITION CHARACTERISTICS IN PIPE BUNDLE OF HYDROGENATION AIR COOLER

(71) Applicant: ZHEJIANG SCI-TECH UNIVERSITY, Zhejiang (CN)

(72) Inventors: Haozhe Jin, Zhejiang (CN); Guofu Ou, Zhejiang (CN); Jianping Kuang, Zhejiang (CN); Xueyong Li, Zhejiang (CN); Zuchao Zhu, Zhejiang (CN); Dexiao Fu, Zhejiang (CN); Shumeng Xiao, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 327 days.

(21) Appl. No.: 18/559,565

(22) PCT Filed: Apr. 26, 2022

(86) PCT No.: PCT/CN2022/089355
§ 371 (c)(1),
(2) Date: Jan. 2, 2024

(87) PCT Pub. No.: WO2022/237531
PCT Pub. Date: Nov. 17, 2022

(65) Prior Publication Data
US 2024/0230254 A1 Jul. 11, 2024

(30) Foreign Application Priority Data
May 8, 2021 (CN) .......................... 202110499874.6

(51) Int. Cl.
*F28G 7/00* (2006.01)
*F28G 15/00* (2006.01)
(Continued)

(52) U.S. Cl.
CPC ............. *F28G 7/00* (2013.01); *F28G 15/003* (2013.01); *G01J 2005/0077* (2013.01); *G01J 5/485* (2022.01)

(58) Field of Classification Search
None
See application file for complete search history.

(56) References Cited

U.S. PATENT DOCUMENTS 3,099,759 A 7/1963 Mcauley

FOREIGN PATENT DOCUMENTS

CN 102338762 B * 5/2013
CN 103245222 8/2013
(Continued)

OTHER PUBLICATIONS

"International Search Report (Form PCT/ISA/210) of PCT/CN2022/089355," mailed on Jul. 8, 2022, with English translation thereof, pp. 1-4.

*Primary Examiner* — Jenna M Maroney
(74) *Attorney, Agent, or Firm* — JCIPRNET

(57) ABSTRACT

A method for identifying and eliminating ammonium salt deposition characteristics in a pipe of a hydrogenation air cooler is provided. A multiphase flow medium enters an inlet pipe box of a hydrogenation air cooler; an initial service state is calibrated, an initial temperature calibration line and an equivalent temperature reference line are drawn to set a benchmark; cross sections and temperature transmitters are arranged on a pipe bundle of the air cooler at equal intervals in the axial direction; a temperature signal value is monitored and transmitted to a single-chip microcomputer for data analysis; an infrared thermal imager performs photographing, transmits data to determine if an ammonium salt deposition risk is present under this working condition; a monitored temperature value is calculated, an ammonium salt deposition risk identification model is established, and
(Continued)

an ammonium salt deposition risk on a temperature information monitoring section is then determined.

6 Claims, 4 Drawing Sheets

(51) Int. Cl.
  G01J 5/00 (2022.01)
  G01J 5/48 (2022.01)

(56) References Cited

FOREIGN PATENT DOCUMENTS

| CN | 210980985 U | * | 7/2020 |
| CN | 111707126 | | 9/2020 |
| CN | 112524990 | | 3/2021 |
| CN | 113267080 | | 8/2021 |
| CN | 113267081 | | 8/2021 |

* cited by examiner

METHOD FOR IDENTIFYING AND ELIMINATING AMMONIUM SALT DEPOSITION CHARACTERISTICS IN PIPE BUNDLE OF HYDROGENATION AIR COOLER

CROSS-REFERENCE TO RELATED APPLICATION

This application is a 371 of international application of PCT application serial no. PCT/CN2022/089355, filed on Apr. 26, 2022, which claims the priority benefit of China application no. 202110499874.6, filed on May 8, 2021.

TECHNICAL FIELD

The invention relates to a processing method inside a pipe bundle of an air cooler, and particularly relates to a method for identifying and eliminating ammonium salt deposition characteristics in a pipe bundle of a hydrogenation air cooler.

RELATED ART

The level of oil refining is an important indicator of the industrialization level of a country. Since the 1960s, the oil refining industry in China has developed rapidly. In recent years, as the demand in China for oil and gas energy gradually increases, the import volume of inferior crude oil such as high-sulfur, high-acid, chlorine-containing, and heavy-quality crude oil has gradually increased. As of the end of 2020, China's foreign dependence on crude oil has exceeded 70%. The refining of a large amount of inferior crude oil places higher requirements on the operational safety protection of high-risk petrochemical equipment, especially hydrogenation air cooler systems.

As the device size increases, raw materials become inferior, and the working conditions become critical, unplanned shutdown accidents caused by corrosion failure of hydrogenation air coolers are very prominent. Such failure is mainly presented in the form of crystallization and deposition blockage of ammonium salt. The crystallization, deposition, and corrosion of ammonium salt in a hydrogenation air cooler are affected by many factors, including the properties of the raw oil, design defects, operating conditions, etc. The process is complicated and very difficult to predict, prevent and control. During the processing of inferior crude oil with high sulfur, high acid, chlorine, and heavy quality, a large amount of components that crystallize easily, such as $NH_3$, $H_2S$, and HCl may be produced. During the flowing, heat transfer, and phase change processes, such easy-to-crystallize components, e.g., $NH_3$, $H_2S$, and HCl may undergo a crystallization reaction to form $NH_4Cl$ or $NH_4HS$ in the particulate phase. Under a working condition without liquid water, the crystallized ammonium salt quickly blocks the pipe bundle, thus blocking and deforming the pipe bundle. When the number of blocked pipes reaches a threshold value, the flow rate in an unblocked pipe in the air cooler pipe bundle tends to be high, as the system load has not changed. Under a working condition with aqueous solution of $NH_4HS$, a multi-phase flow may wash and cause corrosion, directly and quickly causing perforation and leakage of the air cooler pipe bundle with a wall thickness of only 3 mm. Therefore, how to accurately determine the crystallization and deposition status of ammonium salt in the air cooler pipe bundle based on the actual service environment of the hydrogenation air cooler is key to intelligently maintaining and operating the hydrogenation air cooler.

According to non-exhaustive statistics, during the flowing, heat transfer, and phase change processes, the deposition and blockage failures of $NH_4Cl$ salt in pipe bundles of hydrogenation air coolers mainly occur in the first pipe pass between the first pipe box (inlet) and the second pipe box. The risk of pipe bundle blockage and deformation of $NH_4Cl$ mainly includes two aspect: the first is that there is a characteristic of critical pipe blockage; that is, if the number of blocked pipes reaches the critical number of blocked pipes, the circulating pipe bundle is prone to deform due to an overload thermal stress, thus triggering an expansion welded area between the pipe bundle and a pipe plate of the pipe box to fall off, causing an oil-gas-water multi-phase flow medium to leak, and resulting in an unplanned shutdown accident; the second is that if pipe blockage occurs due to $NH_4Cl$ deposition, due to the influence of processing load, the heat exchange cooling effect of the hydrogen air cooler is poor, which directly causes the outlet temperature of the hydrogenation cooler to fail to meet the temperature value required by the process, thus significantly affecting the operation and maintenance of the processing equipment in subsequent processing stages. For early warning of ammonium salt deposition in the pipe bundle of the hydrogenation air cooler, a method commonly used in the oil refining industry is to focus on the infrared thermal imaging analysis of the temperature field of the first tube pass of the air cooler. Although infrared thermal imaging can identify the surface temperature of the air cooler pipe bundle, once pipe blockage occurs due to ammonium salt deposition, it does not have an effective measure to eliminate ammonium salt deposition. After ammonium salt deposits block the pipe bundle, the blockage causes a biased flow in the flow field structure inside the air cooler pipe bundle. As a result, ammonium salt deposition and blockage may occur in more pipe bundles.

SUMMARY OF INVENTION

In view of the risk of pipe bundle blockage or leakage and explosion of pipes caused by ammonium salt deposition in hydrogenation air coolers in the oil refining industry, an objective of the invention is to provide a method suitable for early identification of the characteristics of ammonium salt deposition in the pipe bundle of the hydrogenation air cooler as well as precise elimination, and intelligent regulation, so as to eliminate or reduce the risk of unplanned shutdowns due to ammonium salt deposition, secure the safe, stable, and long-term operation of the hydrogenation air cooler in a service environment with changing working conditions, such as flowing, heat transfer, phase change, etc., thereby improving the intensive efficiency of the entire oil refining industry. The surface temperature field of the hydrogenation air cooler is monitored in real time, such that early identification, state monitoring and precise intelligent elimination of ammonium salt deposition characteristics in a pipe are realized.

To achieve the objective of the invention, a technical solution adopted by the invention is as follows:

I. A method for identifying and eliminating ammonium salt deposition characteristics in a pipe bundle of a hydrogenation air cooler is provided. The method has steps as follows:

Step 1) entering a multi-phase flow medium containing hydrocarbons, oil, water into a hydrogenation air cooler inlet pipe box from an inlet flange, the multi-phase medium flowing through a row of air cooler pipe bundles arranged in parallel to a hydrogenation air cooler outlet pipe box, where a frequency variable fan is installed to a bottom part of the air cooler pipe bundles, and the multi-phase flow medium in the air cooler pipe bundles flows by using the frequency variable fan to exchange heat and be cooled off; calibrating initial service states of the air cooler pipe bundles for the air cooler pipe bundles to draw a temperature initial calibration line of the respective air cooler pipe bundles on a same longitudinal cross-sectional surface; and calibrating initial service states of the air cooler pipe bundles, specifically including: dividing, along a bundle length direction, into N+1 pitch segments, and dividing the air cooler pipe bundle into N sections by using N sets of temperature transmitters, a total of N temperature initial calibration lines of the air cooler pipe bundle being provided in the initial service state; photographing an image of the air cooler pipe bundle at a time of initial service by using an infrared thermal imager to serve as a bundle temperature information reference image, and wirelessly transmitting the image to an industrial computer; calibrating a temperature field distribution of the hydrogenation air cooler pipe bundle at initial service through data calculation, and drawing N temperature initial calibration lines from the first air cooler pipe bundle to the i$^{th}$ air cooler pipe bundle in the same axial direction on the N sections; and by setting a surface temperature field of the air cooler pipe bundle at initial service as benchmark and setting a temperature difference of 10° C. as benchmark, drawing a plurality of equivalent temperature reference lines, and respectively setting N temperature initial calibration lines and the temperature equivalent reference lines as control benchmark lines, and storing the control benchmark lines in a database of the industrial computer.

Step 2) adopting a position where the hydrogenation air cooler inlet pipe box and the pipe bundle are connected as an initial position of an axial length of the air cooler pipe bundle, and adopting a position where the hydrogenation air cooler outlet pipe box is located as an end position of the axial length of the air cooler pipe bundle, and setting the axial length of the air cooler pipe bundle as L; setting N sections at equal intervals along an axial direction in the air cooler pipe bundle as temperature information monitoring sections, setting one set of temperature transmitters at each of the temperature information monitoring sections, where each set of the temperature transmitters has M temperature transmitters, the M temperature transmitters in each set of the temperature transmitters are disposed at intervals along an outer wall of the air cooler pipe bundle in the temperature information monitoring section, an outer wall temperature of the air cooler pipe bundle is monitored in real time by using a total of N*M temperature transmitters in the N sections; setting a number of the air cooler pipe bundles as W, thereby making a total of the temperature transmitters provided in all of the air cooler pipe bundles N*M*W.

Step 3) transmitting a temperature signal value monitored by each of the temperature transmitters to a single-chip microcontroller through an RS485 bus for data analysis and sorting.

Step 4) performing temperature photographing on the hydrogenation air cooler pipe bundles regularly by using an infrared thermal imager located above the air cooler pipe bundles, and transmitting wirelessly a bundle temperature information image obtained through photographing to an industrial computer for data management, and, with the temperature difference of 10° C. as the benchmark, establishing a graph with a plurality of temperature equivalent actual lines through data processing; comparing the graph with the temperature equivalent actual lines with the temperature equivalent reference lines drawn in Step 1), and, in response to the graph of temperature equivalent actual lines of a corresponding air cooler pipe bundle monitored in real time being lower than the temperature equivalent reference lines by 6%, determining that there is a risk that ammonium salt is deposited under such working condition, and performing a next step to determine an exact temperature information monitoring section where ammonium salt deposits are located;

Step 5) for each of the temperature information monitoring sections, performing calculation on a monitored temperature value of the temperature information monitoring section obtained by using the temperature transmitters as follows:

$$T_{iN} = \left( \sum_{u=1}^{M} T_{iNu} \right) \Big/ M$$

where in the equation, $T^{in}$ represents the monitored temperature value on an $N^{th}$ temperature information monitoring surface of an i$^{th}$ air cooler bundle pipe, $T_{iNu}$ represents a temperature detected by an u$^{th}$ temperature transmitter on the $N^{th}$ temperature information monitoring section of the i$^{th}$ air cooler bundle pipe, i represents a serial number of the air cooler pipe bundle, N represents a serial number of the temperature information monitoring section, and u represents a serial number of the temperature transmitter on the temperature information monitoring section, u having a maximum value M.

Establishing an ammonium salt deposition risk identification model on whether ammonium salt is deposited in the pipe bundle of the hydrogenation air cooler as follows:

$$e = \left( \frac{\left( \sum_{i=1}^{Q} T_{iN} \right) - Q \cdot \min(T_{iN})}{\left( \sum_{i=1}^{Q} T_{iN} \right)} \right)$$

where Q represents a total number of the air cooler pipe bundles, min( ) indicates a minimum value to be obtained, and e represents a temperature deviation rate;

in response to the temperature deviation rate e satisfying e≥5%, then there is a risk that ammonium salt is deposited in the Nth temperature information monitoring section of the ith air cooler pipe bundle, and a next step is carried out;

in response to the temperature deviation rate e satisfying e<5%, then there is no risk that ammonium salt is deposited in the Nth temperature information monitoring section of the ith air cooler pipe bundle;

Step 6) for the Nth temperature information monitoring cross-section of the ith air cooler pipe bundle having been determined that there is a risk that ammonium salt is deposited in Step 5), driving, by using a DC power source, a vehicle-mounted mechanism to move along sliding rails to above two semi-open clamps closest to the Nth temperature information monitoring section; respectively hanging down a cable with fixing and support structures and, at terminals, magnetic blocks from middle portions of two side grooves of the vehicle-mounted mechanism perpendicular to the air cooler pipe bundle; controlling to move the cable whose two terminals have the magnetic blocks to respectively magnetically attract and be connected with an electromagnet located in the semi-open clamp at two ends of a pitch segment where the Nth temperature information monitoring section is located, applying a frequency variable signal to a circuit in the pitch segment where the Nth temperature information monitoring section is located by using a frequency variable vibration damper having a control switch, and peeling off ammonium salt deposits on an inner wall of the air cooler pipe bundle by vibration of the pipe bundle through intermittent, high-frequent ON-OFF/opening-closing of the electromagnet and the magnetic blocks.

Meanwhile, transmitting ultrasonic signals using an ultrasonic wave generator through an electronic control system to a region where ammonium salt is deposited in the pitch segment where the $N^{th}$ temperature information monitoring section is located, where the ultrasonic signals drive block-like or sheet-like ammonium salt deposits to peel off from the inner wall of the pipe bundle, completing removal and regulation of the ammonium salt deposits when the temperature deviation rate e<3% is detected through monitoring in real-time, and returning the vehicle-mounted mechanism to a terminal position of the air cooler pipe bundle.

Step 7) based on steps in Step 1) to Step 6), monitoring in real time the temperature of each of the air cooler pipe bundles by using the industrial computer, and, intelligently looking for the temperature information monitoring section where ammonium salt is deposited in the air cooler pipe bundle and the pitch segment where the temperature information monitoring section is located according to the ammonium salt deposition risk identification model, the N temperature initial calibration lines, and the temperature equivalent reference lines, and driving the vehicle-mounted mechanism to remove the ammonium salt deposition characteristics of the air cooler pipe bundle and the corresponding pitch segment.

II. A system for identifying and eliminating ammonium salt deposition characteristics in a pipe bundle of a hydrogenation air cooler is provided.

The system includes a temperature information monitoring and transmission system, a self-elimination unit, an air cooler pipe bundle, a hydrogenation air cooler inlet pipe box, and a hydrogenation air cooler outlet pipe box. The hydrogenation air cooler inlet pipe box and the hydrogenation air cooler outlet pipe box are connected by using the air cooler pipe bundles parallel to each other and connected in parallel, and two inlet flanges are provided on the hydrogenation air cooler inlet pipe box. The multi-phase flow medium containing hydrocarbons, oil, water is transmitted by the air cooler pipe bundles, and the temperature information monitoring and transmission system and the self-elimination unit are disposed for each of the air cooler pipe bundles. The temperature information monitoring and transmission system is mainly formed by N sets of the temperature transmitters. Different sets of the temperature transmitters are respectively disposed at equal intervals on outer wall surfaces of different sections of the air cooler pipe bundles, each set of the temperature transmitter is mainly formed by M temperature transmitter pieces provided on a same section and along a sectional circumference, and each temperature transmitter piece in the same set of the temperature transmitters is attached to the outer wall of the air cooler pipe bundle.

The self-elimination unit includes sliding rails, a vehicle-mounted mechanism, an ultrasonic wave generator, and a frequency variable vibration damper. The sliding rails are installed above the hydrogenation air cooler inlet pipe box and the hydrogenation air cooler outlet pipe box. Specifically, the sliding rails 6 are installed in opposite directions by being fixed, through welding, along the inner side surfaces. The sliding rails are parallel to the air cooler pipe bundle and located above the air cooler pipe bundle. A top part of the vehicle-mounted mechanism is installed to hang on lower surfaces of the sliding rails through pulleys and moves in a horizontal direction along the sliding rails. The two side grooves parallel to the air cooler pipe bundle are provided on both sides of the vehicle-mounted mechanism, the ultrasonic wave emitter and the frequency variable vibration damper are respectively fit into the two side grooves, the single-chip microcomputer is further disposed on the vehicle-mounted mechanism, and the cable having the magnetic blocks and connected with the single-chip microcomputer is disposed on a bottom surface of the vehicle-mounted mechanism.

For a pipe bundle in the predetermined length L, the sections where the N sets of temperature transmitters are located divide the air cooler pipe bundle into N+1 pitch segments along a length direction. An electromagnet assembly is installed on outer walls of two segments of the air cooler pipe bundle (5) of any pitch segment. The electromagnet assembly includes the semi-open clamp and the electromagnet, the semi-open clamp is sleeved on the outer wall of the air cooler pipe bundle, the semi-open clamp is installed on the outer wall of the air cooler pipe bundle in a middle portion of each pitch segment. The semi-open clamp is divided into two semi-circular hoops and is formed by a magnetic material. Middle portions of the two semi-circular hoops are placed on two sides of the air cooler tube bundle whose fins are removed. Bottom ends of the two semi-circular hoops are riveted at the bottom part of the air cooler pipe bundle. A gap is provided between top ends of the two semi-circular hoops at a top part of the air cooler pipe bundle, and the electromagnet is fit into the gap. Two ends of a coil of the electromagnet are disposed on a top surface, through connection between the two ends of the coil and the cable with the magnetic blocks, the electromagnet is electrically connected with the single-chip microcomputer on the vehicle-mounted mechanism. the single-chip microcomputer, the ultrasonic wave generator, and the frequency variable vibration damper are connected with the electronic control system via the communication cable, and the electronic control system is connected with the industrial computer.

A buffer washer is fit into a circumferential gap between the semi-open clamp and the air cooler bundle.

The temperature initial calibration lines indicating an equivalent temperature are provided on surfaces of the air cooler pipe bundles.

Advantageous Effects of the Invention are as Follows

The invention carries out early identification and determination of the risk of ammonium salt deposition by establishing an ammonium salt deposition risk identification model, in combination with infrared thermal imaging and temperature information monitoring and transmission systems.

On the basis of accurately predicting the risk of ammonium salt deposition, ammonium salt deposited on the inner wall of the pipe bundle is accurately removed by adopting the variable frequency oscillation damper and the ultrasonic technique, thereby realizing an intelligent regulation method suitable for the temperature field distribution characteristics of the pipe bundle surface.

The invention can provide scientific processing for the optimizing the design and adjusting and maintaining the operation for failures of the hydrogenation air cooler against ammonium salt deposition. In addition, the invention can accurately identify and determine the equipment service status and flow corrosion risk of the hydrogenation air cooler, evaluate the effect of salt removal through water injection from upstream of the hydrogenation air cooler, and adjust the water injection amount in real time, thereby meeting the demand for energy saving and environmental protection in the contemporary processing industry.

Figure 1:
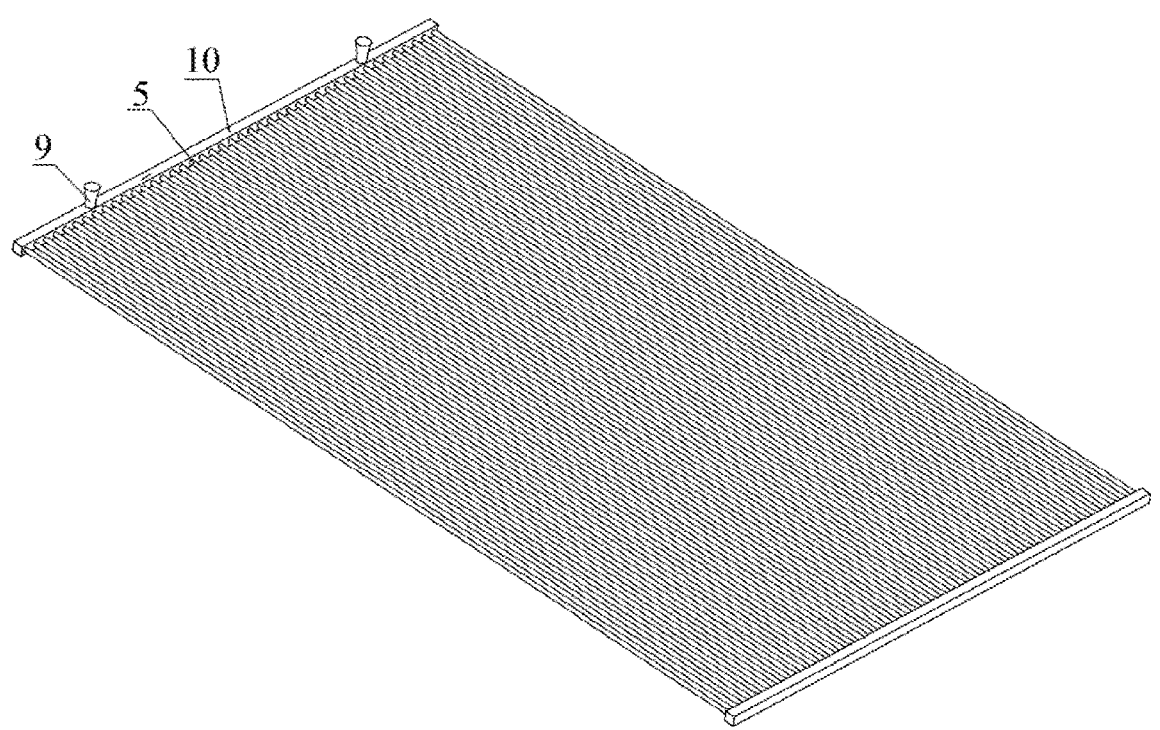
FIG. 1 is a schematic view illustrating an overall structure of a pipe tube of a hydrogenation air cooler according to the invention.

Reference signs in the drawings: 1. Temperature information monitoring and transmission system; 2: Self-elimination unit; 3: Single-chip microcomputer; 4. Temperature transmitter; 5. Air cooler pipe bundle; 6. Sliding rail; 7. Vehicle-mounted mechanism; 8. Ultrasonic wave generator; 9. Inlet flange; 10: Hydrogenation air cooler inlet pipe box; 11. Initial calibration line; 12: Clamp; 13: Electromagnet; 14: Variable frequency oscillation damper; 15: Electronic control system: 16: Industrial computer; 17: Buffer washer.

DESCRIPTION OF EMBODIMENTS

The invention will be described in detail in the following with reference to the embodiments and drawings.

Figure 2:
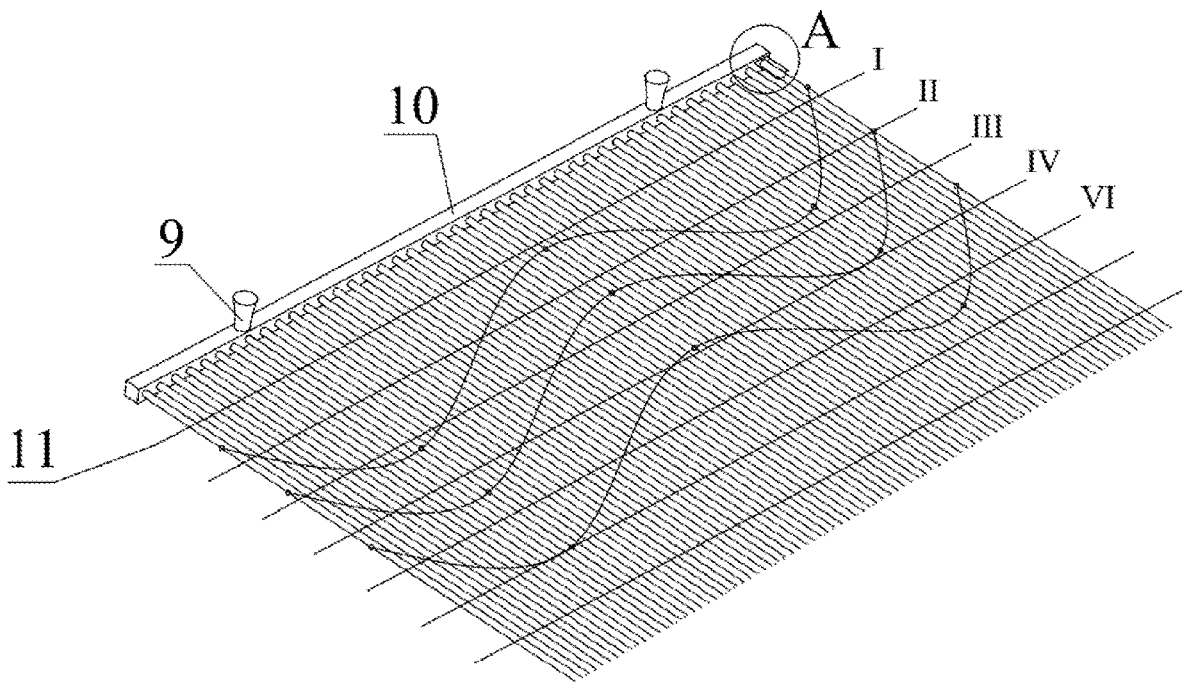
FIG. 2 is a partially enlarged view illustrating the pipe tube of the hydrogenation air cooler according to the invention.
Figure 3:
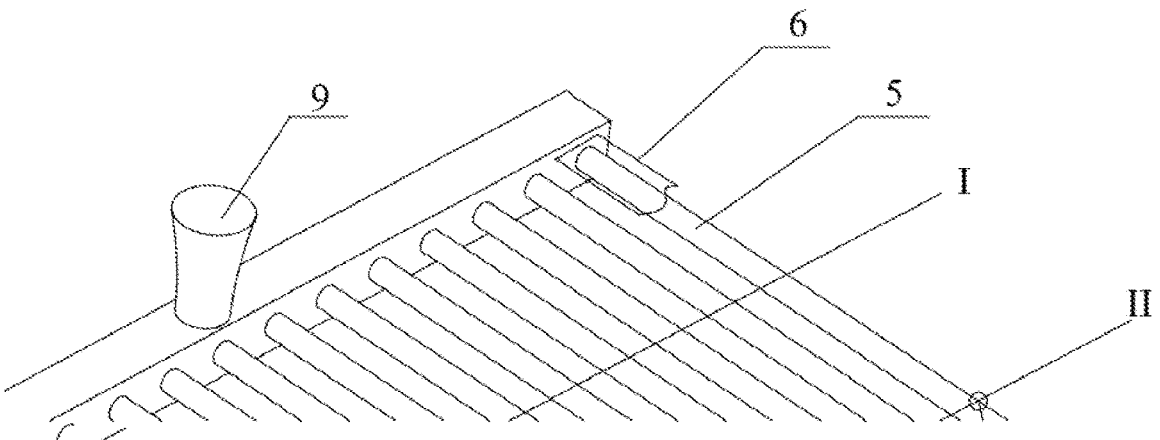
FIG. 3 is an enlarged view of a region A in FIG. 2.

As shown in FIGS. 1, 2, 3, and 4, the invention includes a temperature information monitoring and transmission system 1, a self-elimination unit 2, an air cooler pipe bundle 5, a hydrogenation air cooler inlet pipe box 10, and a hydrogenation air cooler outlet pipe box. The hydrogenation air cooler inlet pipe box 10 and the hydrogenation air cooler outlet pipe box are disposed in parallel at an interval and connected via multiple air cooler pipe bundles 5 parallel to each other and connected in parallel. In an embodiment, the hydrogenation air cooler inlet pipe box 10 and the hydrogenation air cooler outlet pipe box are connected via 45 to 46 air cooler pipe bundles 5 parallel to each other. However, the invention is not limited thereto. The respective air cooler bundles 5 are disposed in parallel at intervals (as shown in FIG. 2). Two inlet flanges 9 are provided on the hydrogenation air cooler 10. The inlet flange 9 serves as the inlet of a multi-phase flow medium containing hydrocarbons, oil, water, etc. The air cooler pipe bundles 5, the hydrogenation air cooler inlet pipe box 10, and the hydrogenation air cooler outlet pipe box jointly form the hydrogenation air cooler.

The hydrogenation air cooler inlet pipe box 10 and the hydrogenation air cooler outlet pipe box both exhibit rectangular box structures. A row of the parallel air cooler pipe bundles 5 having the same structure are evenly distributed on side surfaces along the length direction of the hydrogenation air cooler inlet pipe box 10 and the hydrogenation air cooler outlet pipe box. In addition, the air cooler pipe bundles 5 are at equal intervals. The inlet end of each of the air cooler pipe bundles 5 is fixed with a pipe plate of the hydrogenation air cooler inlet pipe box 10 through welding or expansion welding, so that the fluid domains of the hydrogenation air cooler inlet pipe box 10 and the air cooler pipe bundles 5 are connected with each other. The outlet end of each of the air cooler pipe tubes 5 is connected with a side surface of the hydrogenation air cooler outlet pipe box, so that the hydrogenation air cooler inlet pipe box 10 and the hydrogenation air cooler outlet pipe box are connected via the row of air cooler pipe bundles 5.

The multi-phase flow medium containing hydrocarbons, oil, water is transmitted inside the air cooler pipe bundles 5. The temperature information monitoring and transmission system 1 and the self-elimination unit 2 are disposed for each of the air cooler pipe bundles 5. The temperature information monitoring and transmission system 1 is mainly formed by N sets of the temperature transmitters 4 with high temperature resistance $\geq 200°$ C. Different sets of the temperature transmitters 4 are respectively disposed on the outer wall surfaces of different sections of the air cooler pipe bundles 5. Each set of the temperature transmitters 4 is mainly formed by M temperature transmitter pieces provided on the same section along the sectional circumference of the section. Each temperature transmitter piece in the same set of the temperature transmitters 4 is attached to the outer wall of the air cooler pipe bundle 5. In an embodiment, each of the temperature transmitters 4 is attached to the outer wall of the air cooler pipe bundle 5. In addition, a number $M^u$ of the temperature transmitters 4 located on the upper part of the outer wall of the air cooler pipe bundle 5 is greater than a number $M^d$ of the temperature transmitters 4 located on the lower part of the outer wall of the air cooler pipe bundle 5, i.e., $M=M_u+M_d$. The sections where different sets of the temperature transmitters 4 are located are evenly distributed at equal intervals in the length direction along the axial direction of the air cooler pipe bundle.

Figure 4:
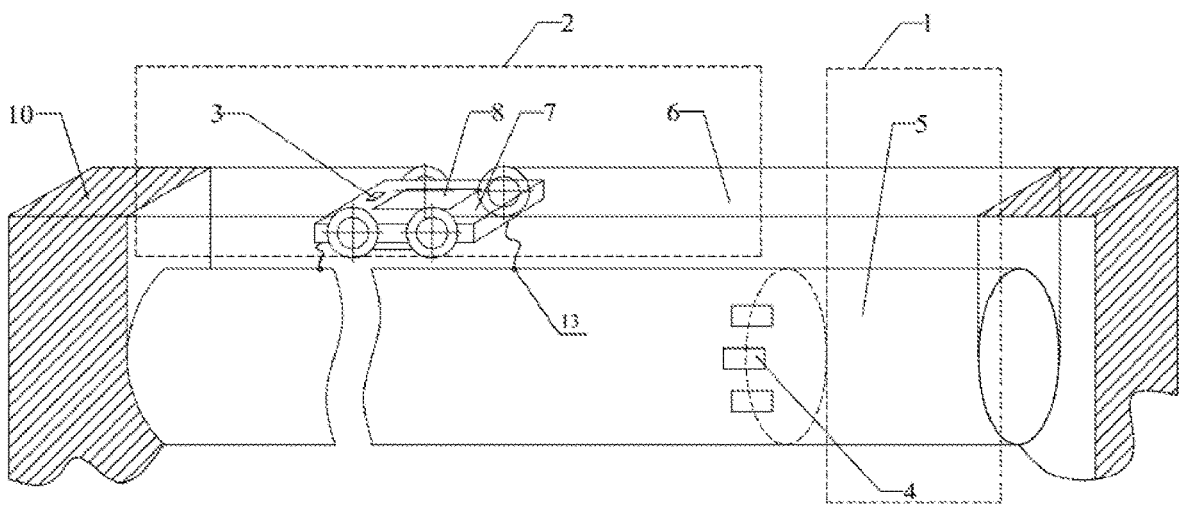
FIG. 4 is a schematic view illustrating a structure for a method for identifying and eliminating ammonium salt deposition characteristics according to the invention.
Figure 5:
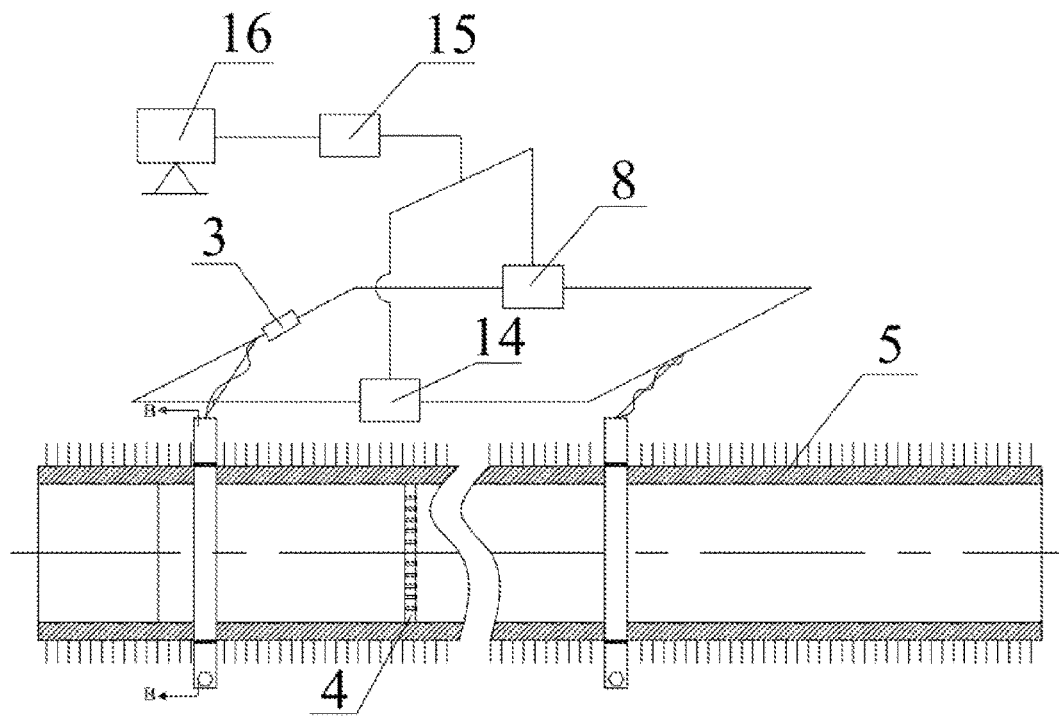
FIG. 5 is a schematic view illustrating implementation of the method for identifying and eliminating ammonium salt deposition characteristics according to the invention.
Figure 6:
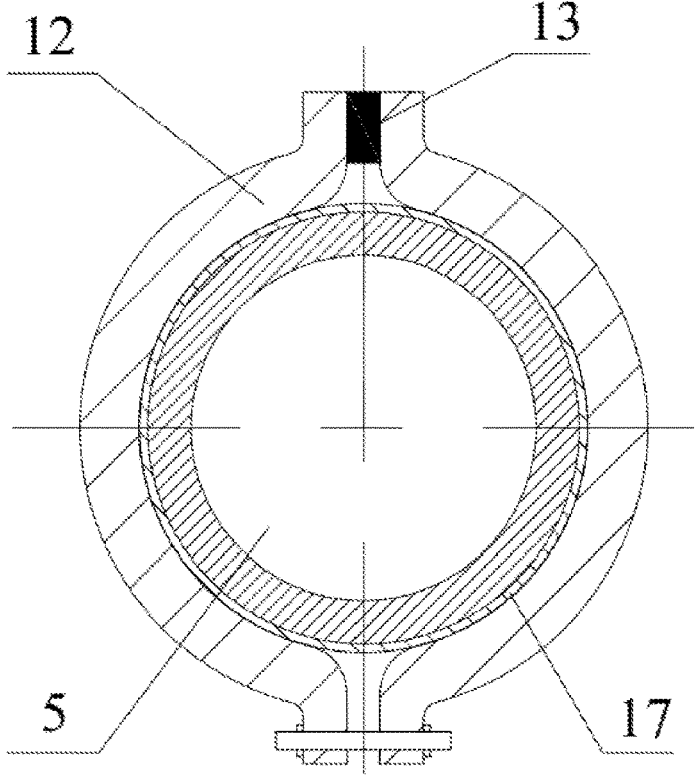
FIG. 6 is a schematic longitudinal cross-sectional view of a semi-open clamp according to the invention.

As shown in FIGS. 4, 5, and 6, the self-elimination unit 2 includes sliding rails 6, a vehicle-mounted mechanism 7, an ultrasonic wave generator 8, and a frequency variable vibration damper 14 having a control switch. The sliding rails 6 formed by a high-temperature resistant resin material are installed in opposite directions by being fixed, through welding, along the inner side surfaces of the hydrogenation air cooler inlet pipe box 10 and the hydrogenation air cooler outlet pipe box. The sliding rails 6 are parallel to the air cooler pipe bundle 5 and located above the air cooler pipe bundle 5. Specifically, the parallel sliding rails 6 formed by a high-temperature resistant resin material are installed at a height of 20 to 30 mm above the pipe bundle 5. The purpose of adopting a high-temperature resistant resin material is to prevent static electricity from being generated during the friction between the pulleys of the vehicle-mounted mechanism 7 and the rails. The top part of the vehicle-mounted mechanism 7 is installed to hang on the lower surfaces of the sliding rails 6 through the pulleys and moves in the horizontal direction along the sliding rails 6.

Two side grooves parallel to the air cooler pipe bundle 5 are provided on both sides of the square vehicle-mounted mechanism 7. The ultrasonic wave emitter 8 and the frequency variable vibration damper 14 are respectively fit into the two side grooves. A single-chip microcomputer 3 is further disposed on the vehicle-mounted mechanism 7. On the bottom surface of the vehicle-mounted mechanism 7, a cable having magnetic blocks and connected with the single-chip microcomputer 3 is disposed. For a pipe bundle in a predetermined length L, the sections where the N sets of temperature transmitters are located divide the air cooler pipe bundle 5 into N+1 pitch segments along the length direction. An electromagnet assembly is installed on the outer walls of two segments of the air cooler pipe bundle 5 of any pitch segment. The electromagnet assembly includes a semi-open clamp 12 and an electromagnet 13. The semi-open clamp 12 is sleeved on the outer wall of the air cooler pipe bundle 5. The semi-open clamp 12 is installed on the outer wall of the air cooler pipe bundle 5 in the middle portion of each pitch segment. The semi-open clamp 12 is divided into two semi-circular hoops and is formed by a magnetic material. The middle portions of the two semi-circular hoops are placed on the two sides of the air cooler tube bundle 5 whose fins are removed. The bottom ends of the two semi-circular hoops are riveted at the bottom part of the air cooler pipe bundle 5. A gap is provided between the top ends of the two semi-circular hoops at the top part of the air cooler pipe bundle 5, and the electromagnet 13 is fit into the gap. The two ends of the coil of the electromagnet 13 are disposed on the top surface. Through the connection between the two ends of the coil and the cable having the magnetic blocks, the electromagnet 13 is electrically connected with the single-chip microcomputer 3 on the vehicle-mounted mechanism 7. The single-chip microcomputer 3, the ultrasonic wave generator 8, and the frequency variable vibration damper 14 are connected with an electronic control system 15 via a communication cable. The electronic control system 15 is connected with an industrial computer 16.

For a pipe bundle in the predetermined length L, the sections where the N sets of temperature transmitters are located divide the air cooler pipe bundle 5 into N+1 pitch segments along the length direction, and N≥1. When N=1, the set of high-temperature resistant temperature transmitters divides the pipe bundle into two pitch segments. To ensure the effect of monitoring, it is generally set that N≥5.

The electromagnet assembly is installed on the outer wall of the air cooler pipe bundle 5 at two ends of any pitch segment after heat dissipation fins are removed (as shown in FIG. 6). The electromagnet assembly includes the semi-open clamp 12 and the electromagnet 13. The two ends of the coil of the electromagnet 13 are disposed on the top surface. Through the connection between the two ends of the coil and the cable having the magnetic blocks, the electromagnet 13 is electrically connected with the single-chip microcomputer 3 on the vehicle-mounted mechanism 7. The terminals of the communication cable are provided with magnetic blocks. When power is not conducted, the magnetic blocks and the electromagnet 13 are in an ON-state. The single-chip microcomputer 3, the ultrasonic wave generator 8, and the frequency variable vibration damper 14 having the control switch are connected with the electronic control system 15 via the communication cable. The electronic control system 15 is connected with the industrial computer 16 via an RS485 bus. A buffer washer 17 is fit into the circumferential gap between the semi-open clamp 12 and the air cooler bundle 5. In this way, it is ensured that the semi-open clamp 12 and the air cooler base pipe generate vibration only, without dry friction, when the electromagnet 13 is alternately conducted and not conducted with power.

As shown in FIG. 2, a temperature initial calibration line 11 indicating an equivalent temperature is provided on the surfaces of multiple air cooler pipe bundles 5.

As shown in FIGS. 4 and 5, the electronic control system 15 may be a signal controller configured to control the operations of the electromagnet 13, the ultrasonic wave emitter 8, and the frequency variable vibration damper 14. Referring to FIG. 5 as well, two edges of the square vehicle-mounted mechanism 7 perpendicular to the pipe bundle 5 are respectively soldered with fixing and support mechanisms. The communication cable is wound on the fixing and support mechanisms. The terminals of the communication cable are connected with the magnetic blocks. The contacts on the magnetic blocks are respectively in contact with two ends of an external coil of the electromagnet 13. When the frequency variable vibration damper having the control switch is driven to conduct power, the electromagnet 13 generates a magnetic force and drives to bring the top ends of the two semi-circular hoops of the semi-open clamp 12 toward or away from each other reciprocally, thereby driving the semi-open clamp 12 to vibrate at variable frequencies. Thus, the air cooler pipe bundle 5 is vibrated, and the fluid medium in the air cooler pipe bundle 5 is affected, thereby peeling off ammonium salt deposits deposited on the inner wall of the pipe bundle. During the process, the ultrasonic wave emitter 8 generates ultrasonic waves toward the air cooler pipe bundle 5. Since the ultrasonic wave generator 8 is installed on the vehicle-mounted mechanism, and the two edges of the vehicle-mounted mechanism perpendicular to the pipe bundle 5 are soldered with the fixing and support mechanisms, the ultrasonic wave generator automatically converts electrical energy into mechanical energy after emitting ultrasonic waves, causes ultrasonic disturbance at the position where ammonium salt is deposited in the air cooler pipe bundle 5, and urges the ammonium salt deposits on the inner wall of the pipe bundle to peel off.

Specifically, since the frequency variable vibration damper having the control switch is installed in the vehicle-mounted mechanism 7, during the process of emitting ultrasonic waves and the reciprocal process of the magnetic blocks and the electromagnet, with the electronic control system controlling opening and closing of the control switch of the frequency variable vibration damper, the frequency variable vibration of the air cooler pipe bundle is realized. In such process, if a vibration frequency close to the pipe bundle is found, the ammonium salt deposits inside the pipe bundle can be peeled off quickly through resonance. If the amplitude of vibration is too large, excessive energy may be absorbed by the vibration damper to prevent the pipe bundle from being excessively deformed or having warpage.

Figure 7:
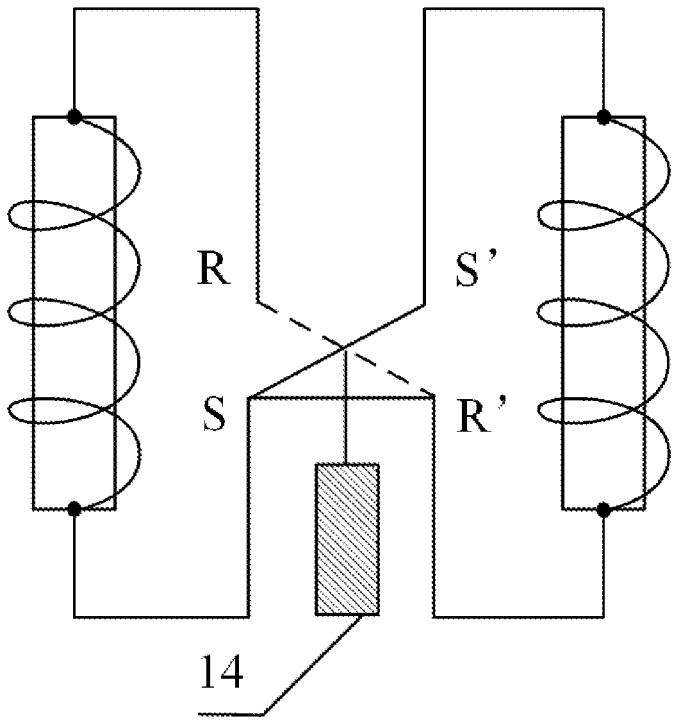
FIG. 7 is a schematic view illustrating connection between an electromagnet and a variable frequency oscillation damper having a control switch according to the invention.

As shown in FIG. 7, FIG. 7 is a schematic view illustrating connection between an electromagnet and a variable frequency oscillation damper having a control switch according to the invention. The two edges of the square vehicle-mounted mechanism 7 perpendicular to the pipe bundle 5 are respectively soldered with the fixing and support mechanisms. The communication cable is wound on the fixing and support mechanisms. The terminals of the communication cable are connected with the magnetic blocks. The contacts (solid black dot areas) on the magnetic blocks are respectively in contact with the two ends of the external coil of the electromagnet 13. The frequency variable vibration damper 14 has the control switch, and different circuits are turned on when the switch is at different positions. When the switch is at a SS' position, a right-side circuit is turned on, and at a RR' position, a left-side circuit is turned on. After the circuit is turned on, the electromagnet 13 becomes magnetic. Through the action of ON/OFF of the circuit, the electromagnet 13 and the top ends of the two semi-circular hoops of the semi-open clamp 12 are reciprocally brought toward or away from each other, thereby making the semi-open clamp vibrate at variable frequencies and thus vibrating the air cooler pipe bundle 5.

Working processes for identifying and eliminating ammonium salt deposition characteristics in the hydrogenation air cooler are specifically as follows:

Step 1) entering the multi-phase flow medium containing hydrocarbons, oil, water into the hydrogenation air cooler inlet pipe box 10 from the inlet flange 9, the multi-phase medium flowing through a row of air cooler pipe bundles 5 arranged in parallel to a hydrogenation air cooler outlet pipe box, wherein a frequency variable fan is installed to a bottom part of the air cooler pipe bundles 5, and the multi-phase flow medium in the air cooler pipe bundles 5 flows by using the frequency variable fan to exchange heat and be cooled off; calibrating initial service states of the air cooler pipe bundles 5 for the air cooler pipe bundles 5 to draw a temperature initial calibration line 11 of the respective air cooler pipe bundles 5 on a same longitudinal cross-sectional surface; and calibrating the initial state of the air cooler pipe bundle 5, specifically including: dividing, along a bundle length direction, into N+1 pitch segments, and dividing the air cooler pipe bundle 5 into N sections by using the N sets of temperature transmitters, a total of N temperature initial calibration lines 11 of the air cooler pipe bundle being provided in the initial service state; photographing an image of the air cooler pipe bundle 5 at the time of initial service by using an infrared thermal imager to serve as a bundle temperature information reference image, and wirelessly transmitting the image to the industrial computer; calibrating a temperature field distribution of the hydrogenation air cooler pipe bundle at initial service through data calculation, and drawing N temperature initial calibration lines 11 from the first air cooler pipe bundle to the i$^{th}$ air cooler pipe bundle in the same axial direction on the N sections; and by setting a surface temperature field of the air cooler pipe bundle at initial service as benchmark and setting a temperature difference of 10° C. as benchmark, drawing a plurality of equivalent temperature reference lines, and respectively setting N temperature initial calibration lines and the temperature equivalent reference lines as control benchmark lines, and storing the control benchmark lines in a database of the industrial computer 16.

Step 2) adopting a position where the hydrogenation air cooler inlet pipe box 10 and the pipe bundle are connected as an initial position of an axial length of the air cooler pipe bundle 5, and adopting a position where the hydrogenation air cooler outlet pipe box is located as an end position of the axial length of the air cooler pipe bundle, and setting the axial length of the air cooler pipe bundle as L; setting N sections at equal intervals along an axial direction in the air cooler pipe bundle as temperature information monitoring sections, setting one set of temperature transmitters 4 at each of the temperature information monitoring sections, wherein each set of the temperature transmitters 4 has M temperature transmitters 4, the M temperature transmitters 4 in each set of the temperature transmitters 4 are disposed at intervals along an outer wall of the air cooler pipe bundle 5 in the temperature information monitoring section, an outer wall temperature of the air cooler pipe bundle is monitored in real time by using a total of N*M temperature transmitters in the N sections; setting a number of the air cooler pipe bundles (5) as W, where it is general that W≥4, thereby making a total of the temperature transmitters provided in all of the air cooler pipe bundles N*M*W; where each temperature information monitoring section has a circumferential direction of 360°, with the vertical upward position being 0° (360°, and M phase positions being selected in the counterclockwise direction as temperature transmitter placement points.

Step 3) transmitting a temperature signal value monitored by each of the temperature transmitters 4 to a single-chip microcontroller 3 through an RS485 bus for data analysis and sorting.

Step 4) performing temperature photographing on the hydrogenation air cooler pipe bundles 5 regularly by using an infrared thermal imager located above the air cooler pipe bundles 5, and transmitting wirelessly a bundle temperature information image obtained through photographing to an industrial computer 16 for data management, and, with the temperature difference of 10° C. as the benchmark, establishing a graph with a plurality of temperature equivalent actual lines through data processing: comparing the graph with the temperature equivalent actual lines with the temperature equivalent reference lines drawn in Step 1), and, in response to the graph of temperature equivalent actual lines of a corresponding air cooler pipe bundle monitored in real time being lower than the temperature equivalent reference lines by 6%, determining that there is a risk that ammonium salt is deposited under such working condition, and performing a next step to determine an exact temperature information monitoring section where ammonium salt deposits are located;

Step 5) for each temperature information monitoring section, calculating a monitored temperature value of the temperature information monitoring section obtained by using the temperature transmitters as follows:

$$T_{iN} = \left( \sum_{u=1}^{M} T_{iNu} \right) / M,$$

where in the equation, $T^{in}$ represents the monitored temperature value on an N$^{th}$ temperature information monitoring surface of an i$^{th}$ air cooler bundle pipe, $T_{iNu}$ represents a temperature detected by an u$^{th}$ temperature transmitter on the N$^{th}$ temperature information monitoring section of the i$^{th}$ air cooler bundle pipe, i represents a serial number of the air cooler pipe bundle, N represents a serial number of the temperature information monitoring section, and u represents a serial number of the temperature transmitter on the temperature information monitoring section, u having a maximum value M.

Establishing an ammonium salt deposition risk identification model on whether ammonium salt is deposited in the pipe bundle of the hydrogenation air cooler as follows:

$$e = \left| \frac{\left(\sum_{i=1}^{Q} T_{iN}\right) - Q \cdot \min(T_{iN})}{\left(\sum_{i=1}^{Q} T_{iN}\right)} \right|,$$

where Q represents a total number of the air cooler pipe bundles 5, min( ) indicates a minimum value to be obtained, and e represents a temperature deviation rate, in response to the temperature deviation rate e satisfying e≥5%, then there is a risk that ammonium salt is deposited in the Nth temperature information monitoring section of the ith air cooler pipe bundle, and a next step is carried out;

in response to the temperature deviation rate e satisfying e<5%, then there is no risk that ammonium salt is deposited in the Nth temperature information monitoring section of the ith air cooler pipe bundle;

Step 6) for the $N^{th}$ temperature information monitoring cross-section of the $i^{th}$ air cooler pipe bundle having been determined that there is a risk that ammonium salt is deposited in Step 5), driving, by using a DC power source, a vehicle-mounted mechanism 7 to move along sliding rails to above two semi-open clamps 12 closest to the $N^{th}$ temperature information monitoring section; respectively hanging down a cable with fixing and support structures and, at terminals, magnetic blocks from middle portions of two side grooves of the vehicle-mounted mechanism 7 perpendicular to the air cooler pipe bundle; controlling to move the cable whose two terminals have the magnetic blocks to respectively magnetically attract and be connected with an electromagnet 13 located in the semi-open clamp 12 at two ends of a pitch segment where the $N^{th}$ temperature information monitoring section is located, applying a frequency variable signal to a circuit in the pitch segment where the $N^{th}$ temperature information monitoring section is located by using a frequency variable vibration damper 14 having a control switch, and peeling off ammonium salt deposits on an inner wall of the air cooler pipe bundle 5 by vibration of the pipe bundle through intermittent, high-frequent ON-OFF/opening-closing of the electromagnet 13 and the magnetic blocks.

Meanwhile, transmitting ultrasonic signals using an ultrasonic wave generator 8 through an electronic control system 15 to a region where ammonium salt is deposited in the pitch segment where the $N^{th}$ temperature information monitoring section is located, wherein the ultrasonic signals drive block-like or sheet-like ammonium salt deposits to peel off from the inner wall of the pipe bundle, completing removal and regulation of the ammonium salt deposits when the temperature deviation rate e<3% is detected through monitoring in real-time, and returning the vehicle-mounted mechanism 7 to a terminal position of the air cooler pipe bundle 5.

Step 7) based on steps in Step 1) to Step 6), monitoring in real time the temperature of each of the air cooler pipe bundles by using the industrial computer 16, and, intelligently looking for the temperature information monitoring section where ammonium salt is deposited in the air cooler pipe bundle and the pitch segment where the temperature information monitoring section is located according to the ammonium salt deposition risk identification model, the N temperature initial calibration lines, and the temperature equivalent reference lines, and driving the vehicle-mounted mechanism 7 to remove the ammonium salt deposition characteristics of the air cooler pipe bundle and the corresponding pitch segment.

It is noted that, in the structure solution provided in the invention, it may be that one vehicle-mounted mechanism 7 is provided, and it may also be that the vehicle-mounted mechanism 7 is installed above each of the pipe bundles. When only one vehicle-mounted mechanism 7 is installed, longitudinal sliding guide rails need to be disposed along the length direction of the hydrogenation air cooler inlet pipe box, so that the vehicle-mounted mechanism 7 may slide to the corresponding pipe bundle to remove ammonium salt deposits.

What is claimed is:

1. A method for identifying and eliminating ammonium salt deposition characteristics in a pipe bundle of a hydrogenation air cooler, the method is characterized in having steps as follows:

Step 1) entering a multi-phase flow medium containing hydrocarbons, oil, water into a hydrogenation air cooler inlet pipe box, the multi-phase medium flowing through a row of air cooler pipe bundles arranged in parallel to a hydrogenation air cooler outlet pipe box, wherein a frequency variable fan is installed to a bottom part of the air cooler pipe bundles, and the multi-phase flow medium in the air cooler pipe bundles flows by using the frequency variable fan to exchange heat and be cooled off; calibrating initial service states of the air cooler pipe bundles for the air cooler pipe bundles to draw a temperature initial calibration line of the respective air cooler pipe bundles on a same longitudinal cross-sectional surface; and by setting a surface temperature field of the air cooler pipe bundle at initial service as benchmark and setting a temperature difference of 10° C. as benchmark, drawing a plurality of equivalent temperature reference lines, and respectively setting N temperature initial calibration lines and the temperature equivalent reference lines as control benchmark lines;

Step 2) adopting a position where the hydrogenation air cooler inlet pipe box and the air cooler pipe bundle are connected as an initial position of an axial length of the air cooler pipe bundle, and adopting a position where the hydrogenation air cooler outlet pipe box is located as an end position of the axial length of the air cooler pipe bundle, and setting the axial length of the air cooler pipe bundle as L; setting N sections at equal intervals along an axial direction in the air cooler pipe bundle as temperature information monitoring sections, setting one set of temperature transmitters at each of the temperature information monitoring sections, wherein each set of the temperature transmitters has M temperature transmitters, the M temperature transmitters in each set of the temperature transmitters are disposed at intervals along an outer wall of the air cooler pipe bundle in the temperature information monitoring section, an outer wall temperature of the air cooler pipe bundle is monitored in real time by using a total of N*M temperature transmitters in the N sections; setting a number of the air cooler pipe bundles as W, thereby making a total of the temperature transmitters provided in all of the air cooler pipe bundles N*M*W;

Step 3) transmitting a temperature signal value monitored by each of the temperature transmitters to a single-chip microcontroller through an RS485 bus for data analysis and sorting;

Step 4) performing temperature photographing on the hydrogenation air cooler pipe bundles regularly by using an infrared thermal imager located above the air cooler pipe bundles, and transmitting wirelessly a bundle temperature information image obtained through photographing to an industrial computer for data management, and, with the temperature difference of 10° C. as the benchmark, establishing a graph with a plurality of temperature equivalent actual lines through data processing; comparing the graph with the temperature equivalent actual lines with the temperature equivalent reference lines drawn in Step 1), and, in response to the graph of temperature equivalent actual lines of a corresponding air cooler pipe bundle monitored in real time being lower than the temperature equivalent reference lines by 6%, determining that there is a risk that ammonium salt is deposited under such working condition, and performing a next step to determine an exact temperature information monitoring section where ammonium salt deposits are located;

Step 5) for each of the temperature information monitoring sections, performing calculation on a monitored temperature value of the temperature information monitoring section obtained by using the temperature transmitters as follows:

$$T_{iN} = \left( \sum_{u=1}^{M} T_{iNu} \right) \Big/ M$$

wherein in the equation, Tin represents the monitored temperature value on an $N^{th}$ temperature information monitoring surface of an $i^{th}$ air cooler bundle pipe, $T^{iNu}$ represents a temperature detected by an $u^{th}$ temperature transmitter on the $N^{th}$ temperature information monitoring section of the $i^{th}$ air cooler bundle pipe, i represents a serial number of the air cooler pipe bundle, N represents a serial number of the temperature information monitoring section, and u represents a serial number of the temperature transmitter on the temperature information monitoring section;

establishing an ammonium salt deposition risk identification model on whether ammonium salt is deposited in the pipe bundle of the hydrogenation air cooler as follows:

$$e = \left| \frac{\left( \sum_{i=1}^{Q} T_{iN} \right) - Q \cdot \min(T_{iN})}{\left( \sum_{i=1}^{Q} T_{iN} \right)} \right|$$

wherein Q represents a total number of the air cooler pipe bundles, min( ) indicates a minimum value to be obtained, and e represents a temperature deviation rate, in response to the temperature deviation rate e satisfying e≥5%, then there is a risk that ammonium salt is deposited in the $N^{th}$ temperature information monitoring section of the $i^{th}$ air cooler pipe bundle, and a next step is carried out;

in response to the temperature deviation rate e satisfying e<5%, then there is no risk that ammonium salt is deposited in the $N^{th}$ temperature information monitoring section of the $i^{th}$ air cooler pipe bundle;

Step 6) for the $N^{th}$ temperature information monitoring cross-section of the $i^{th}$ air cooler pipe bundle having been determined that there is a risk that ammonium salt is deposited in Step 5), driving, by using a DC power source, a vehicle-mounted mechanism to move along sliding rails to above two semi-open clamps closest to the $N^{th}$ temperature information monitoring section;

respectively hanging down a cable with fixing and support structures and, at terminals, magnetic blocks from middle portions of two side grooves of the vehicle-mounted mechanism perpendicular to the air cooler pipe bundle; controlling to move the cable whose two terminals have the magnetic blocks to respectively magnetically attract and be connected with an electromagnet located in the semi-open clamp at two ends of a pitch segment where the $N^{th}$ temperature information monitoring section is located, applying a frequency variable signal to a circuit in the pitch segment where the $N^{th}$ temperature information monitoring section is located by using a frequency variable vibration damper having a control switch, and peeling off ammonium salt deposits on an inner wall of the air cooler pipe bundle by vibration of the pipe bundle through intermittent, high-frequent ON-OFF/opening-closing of the electromagnet and the magnetic blocks, and transmitting ultrasonic signals using an ultrasonic wave generator through an electronic control system to a region where ammonium salt is deposited in the pitch segment where the $N^{th}$ temperature information monitoring section is located, wherein the ultrasonic signals drive block-like or sheet-like ammonium salt deposits to peel off from the inner wall of the pipe bundle, completing removal and regulation of the ammonium salt deposits when the temperature deviation rate e<3% is detected through monitoring in real-time, and returning the vehicle-mounted mechanism to the end position of the air cooler pipe bundle; and Step 7) based on steps in Step 1) to Step 6), monitoring in real time the temperature of each of the air cooler pipe bundles by using the industrial computer, and, intelligently looking for the temperature information monitoring section where ammonium salt is deposited in the air cooler pipe bundle and the pitch segment where the temperature information monitoring section is located according to the ammonium salt deposition risk identification model, the N temperature initial calibration lines, and the temperature equivalent reference lines, and driving the vehicle-mounted mechanism to remove the ammonium salt deposition characteristics of the air cooler pipe bundle and the corresponding pitch segment.

2. The method for identifying and eliminating the ammonium salt deposition characteristics in the pipe bundle of the hydrogenation air cooler as claimed in claim 1, characterized in that a system for identifying and eliminating the ammonium salt deposition characteristics is adopted for the method, the system comprises a temperature information monitoring and transmission system, a self-elimination unit, the air cooler pipe bundles, the hydrogenation air cooler inlet pipe box, and the hydrogenation air cooler outlet pipe box, the hydrogenation air cooler inlet pipe box and the hydrogenation air cooler outlet pipe box are connected by using the air cooler pipe bundles parallel to each other and connected in parallel, two inlet flanges are provided on the hydrogenation air cooler inlet pipe box, the multi-phase flow medium containing hydrocarbons, oil, water is transmitted by the air cooler pipe bundles, and the temperature information monitoring and transmission system and the self-elimination unit are disposed for each of the air cooler pipe bundles, wherein the temperature information monitoring and transmission system is mainly formed by N sets of the temperature transmitters, different sets of the temperature transmitters are respectively disposed at equal intervals on outer wall surfaces of different sections of the air cooler pipe bundles, each set of the temperature transmitter is mainly formed by M temperature transmitter pieces provided on a same section and along a sectional circumference, and each temperature transmitter piece in the same set of the temperature transmitters is attached to the outer wall of the air cooler pipe bundle.

3. The method for identifying and eliminating the ammonium salt deposition characteristics in the pipe bundle of the hydrogenation air cooler as claimed in claim 2, characterized in that the self-elimination unit comprises the sliding rails, the vehicle-mounted mechanism, the ultrasonic wave generator, and the frequency variable vibration damper, the sliding rails are installed above the hydrogenation air cooler inlet pipe box and the hydrogenation air cooler outlet pipe box, the sliding rails are parallel to the air cooler pipe bundle and located above the air cooler pipe bundle, a top part of the vehicle-mounted mechanism is installed to hang on lower surfaces of the sliding rails through pulleys and moves in a horizontal direction along the sliding rails, the two side grooves parallel to the air cooler pipe bundle are provided on both sides of the vehicle-mounted mechanism, the ultrasonic wave generator and the frequency variable vibration damper are respectively fit into the two side grooves, the single-chip microcomputer is further disposed on the vehicle-mounted mechanism, and the cable having the magnetic blocks and connected with the single-chip microcomputer is disposed on a bottom surface of the vehicle-mounted mechanism.

4. The method for identifying and eliminating the ammonium salt deposition characteristics in the pipe bundle of the hydrogenation air cooler as claimed in claim 2, characterized in that, for a pipe bundle in the predetermined length L, the sections where the N sets of temperature transmitters are located divide the air cooler pipe bundle into N+1 pitch segments along a length direction, an electromagnet assembly is installed on outer walls of two segments of the air cooler pipe bundle of any pitch segment, the electromagnet assembly comprises the semi-open clamp and the electromagnet, the semi-open clamp is sleeved on the outer wall of the air cooler pipe bundle, the semi-open clamp is installed on the outer wall of the air cooler pipe bundle in a middle portion of each pitch segment, the semi-open clamp is divided into two semi-circular hoops and is formed by a magnetic material, middle portions of the two semi-circular hoops are placed on two sides of the air cooler tube bundle whose fins are removed, bottom ends of the two semi-circular hoops are riveted at the bottom part of the air cooler pipe bundle, a gap is provided between top ends of the two semi-circular hoops at a top part of the air cooler pipe bundle, and the electromagnet is fit into the gap, two ends of a coil of the electromagnet are disposed on a top surface, through connection between the two ends of the coil and the cable with the magnetic blocks, the electromagnet is electrically connected with the single-chip microcomputer on the vehicle-mounted mechanism, and the single-chip microcomputer, the ultrasonic wave generator, and the frequency variable vibration damper are connected with the electronic control system via the communication cable, and the electronic control system is connected with the industrial computer.

5. The method for identifying and eliminating the ammonium salt deposition characteristics in the pipe bundle of the hydrogenation air cooler as claimed in claim 2, characterized in that a buffer washer is fit into a circumferential gap between the semi-open clamp and the air cooler bundle.

6. The method for identifying and eliminating the ammonium salt deposition characteristics in the pipe bundle of the hydrogenation air cooler as claimed in claim 2, characterized in that the temperature initial calibration lines indicating an equivalent temperature are provided on surfaces of the air cooler pipe bundles.

* * * * *